May 2, 1939.   R. W. WAGNER   2,157,041
MOWING MACHINE STRUCTURE
Filed Jan. 3, 1938   2 Sheets-Sheet 1
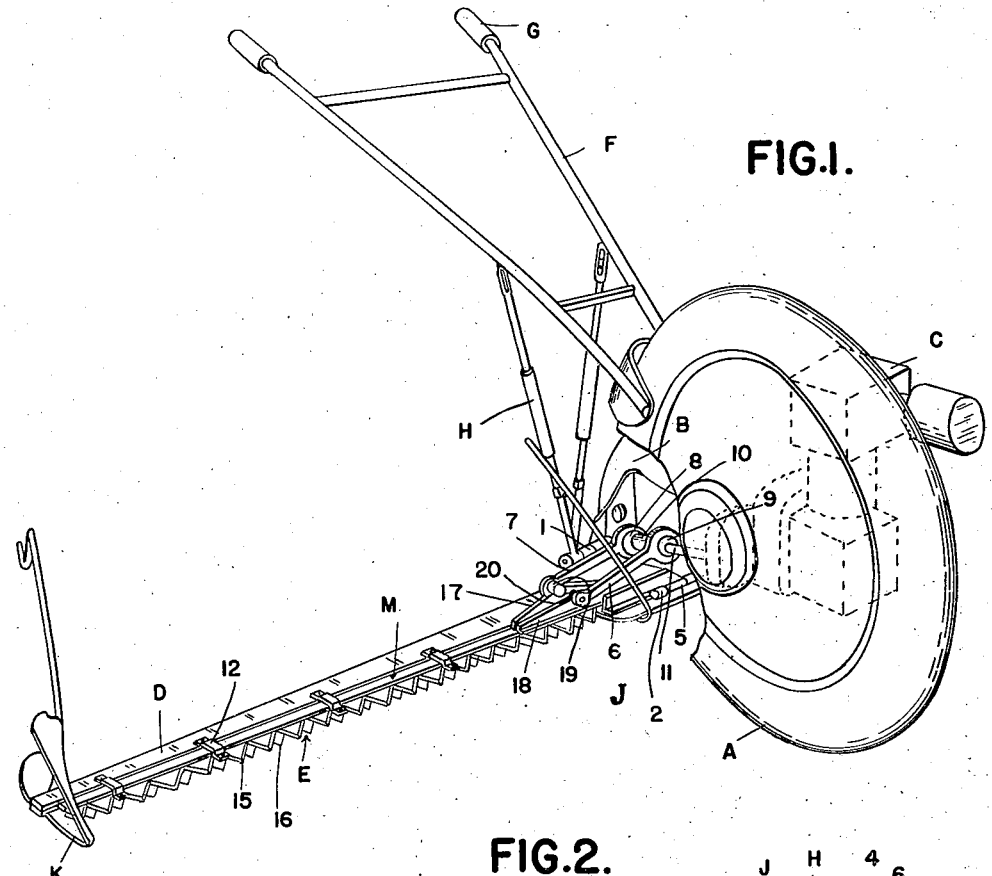
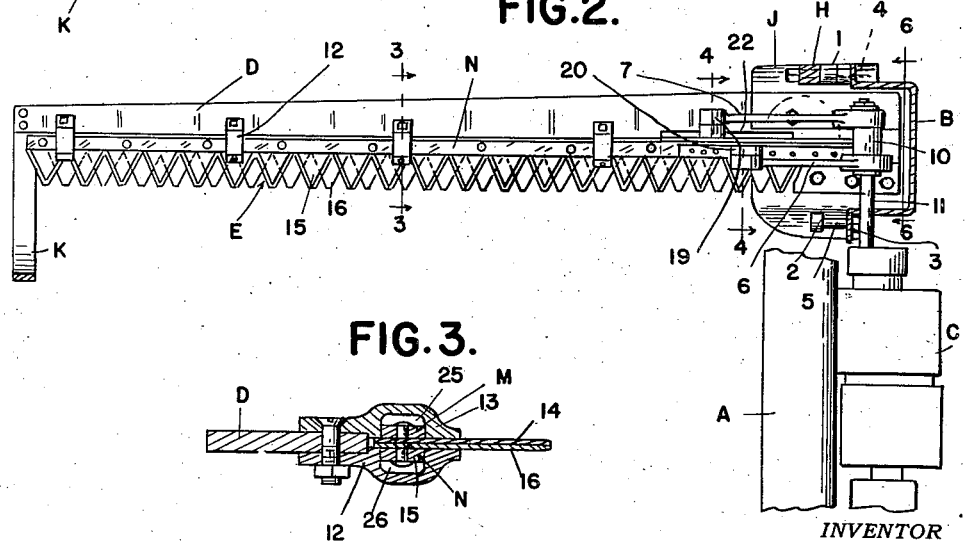
INVENTOR
ROBERT W. WAGNER
ATTORNEYS May 2, 1939.  R. W. WAGNER  2,157,041
MOWING MACHINE STRUCTURE
Filed Jan. 3, 1938  2 Sheets-Sheet 2
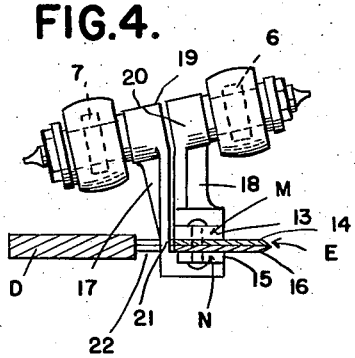
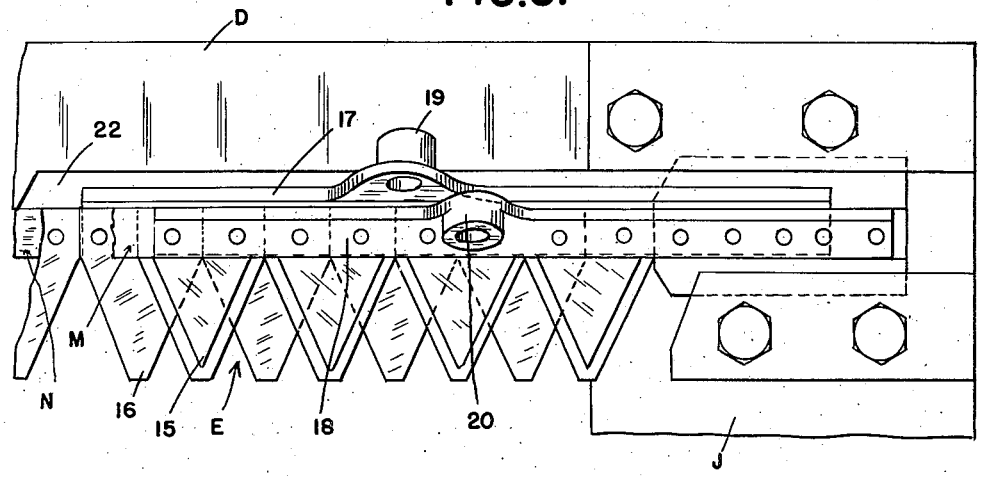
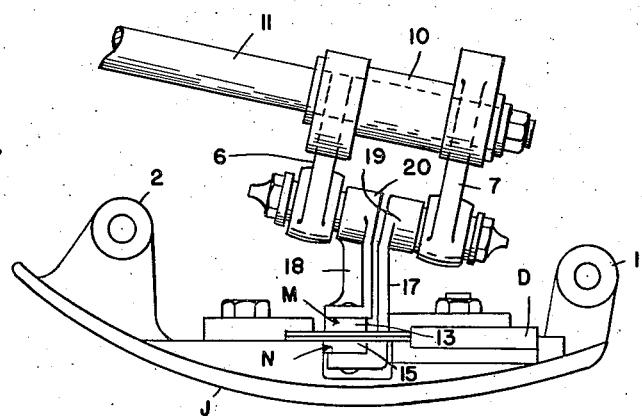
INVENTOR
ROBERT W. WAGNER
BY
ATTORNEYS Patented May 2, 1939

2,157,041

UNITED STATES PATENT OFFICE 2,157,041

MOWING MACHINE STRUCTURE

Robert W. Wagner, Detroit, Mich., assignor to Detroit Harvester Company, Detroit, Mich., a corporation of Michigan Application January 3, 1938, Serial No. 183,175

3 Claims. (Cl. 56—297)

This invention relates generally to mowing machines and refers more particularly to the cutter mechanism thereof.

Heretofore it has been customary to provide a stationary cutter bar and a reciprocating cutter bar or sickle associated therewith as the cutter mechanism of mowing machines. However, such constructions had certain inherent vibration due to failure to properly counterbalance the reciprocating cutter bar, and it was just about impossible to counterbalance the reciprocating cutter bar to eliminate such vibration. Some attempts have been made to counterbalance the reciprocating cutter bar at the drive flywheel by counterbalancing said flywheel but this has not been satisfactory. Moreover, where there is only one reciprocating cutter bar, it frequently happens that grease and the like collects on the guards or guard fingers on the stationary bar and thus interfere with the proper cutting operation of the machine.

In the present instance I have provided a cutter mechanism that eliminates the inherent vibration aforesaid and that cuts cleaner and more efficiently than heretofore. Preferably this is accomplished by removing entirely the knife guards and providing two reciprocating cutter bars or sickles arranged one on top of the other and moving in opposite directions. These bars are preferably driven by pitman rods operated by eccentrics disposed approximately 180° apart, and are held in place by suitable clips which keep the cutting edges of the respective bars in proper cutting relation to each other.

In the accompanying drawings,

Figure 1 is a perspective view of a mowing machine embodying my invention;

Figure 2 is a fragmentary top plan view thereof with parts broken away and in section;

Figure 3 is a sectional view taken substantially on the line 3—3 of Figure 2;

Figure 4 is a sectional view taken substantially on the line 4—4 of Figure 2;

Figure 5 is an enlarged fragmentary top plan view of the cutter mechanism and associated parts;

Figure 6 is a sectional view taken substantially on the line 6—6 of Figure 2.

Referring now to the drawings, A is a ground wheel on which is supported a frame B, C is a power plant for the machine carried by said frame upon one side of the wheel A, and D is a laterally extending bar upon the other side of the wheel and carrying the cutter mechanism E. Preferably the frame B has rearwardly extending handlebars F provided at their rear ends with suitable grips G and provided adjacent the wheel A with a substantially V-shaped brace H.

J and K, respectively, are ground-engaging shoes at opposite ends of the bar D and rigidly secured thereto. 1, 2 and 3, respectively, are upstanding arms on the shoe J connected by bolts 4 and 5 to the frame B. The bolt 4 also serves to connect the brace H to the frame.

M and N, respectively, are the reciprocating cutter bars or sickles arranged one on top of the other and moving in opposite directions. Preferably these bars are driven by pitman rods 6 and 7 operated by eccentrics 8 and 9 disposed approximately 180° apart on a sleeve 10 non-rotatably mounted on the drive shaft 11 of the power plant C, and are held in place by clips 12 which keep the cutting edges of the respective bars M and N in proper cutting relation to each other. As shown, the cutting bar M comprises a bar 13 and a series of blades 14 riveted to the underside thereof, while the cutter bar N comprises a bar 15 and a series of blades 16 riveted to the upper side thereof. 17 and 18, respectively, are elongated brackets fixed to the bars 13 and 15, respectively and having bosses 19 and 20 pivotally connected to the pitman rods 6 and 7, respectively. Preferably the bracket 18 is fastened to the upper side of the bar 13, while the bracket 17 is fastened to the underside of the bar 15 and has a portion 21 movable in a suitable slot or opening 22 in the laterally extending supporting bar D.

The clips 12 are arranged in pairs at spaced points longitudinally of the supporting bar D, being preferably upon opposite sides thereof and bolted thereto, and have opposed recesses 25 and 26, respectively, for the bars 13 and 15. By referring to Figure 3, it will be noted that opposite sides of the recesses 25 and 26 substantially engage and serve as guides for the bars 13 and 15 and thus keep the blades 14 and 16 carried by said bars in proper cutting relation to each other.

In use, the cutter bars M and N will be reciprocated in opposite directions by the pitman rods 6 and 7 operated by the eccentrics 8 and 9 on the drive shaft 11. As a result, the cutter bars M and N will make clean cuts without objectionable vibration.

What I claim as my invention is:

1. In a mowing machine, a cutter mechanism comprising two reciprocating cutter bars arranged in superposed relation, each cutter bar having an elongated bar and a series of blades fixed thereto, said elongated bars being spaced vertically apart and substantially parallel, the blades being upon the opposed faces of said elongated bars and projecting laterally therefrom, a common supporting bar for said cutter bars disposed in rear and substantially parallel to said cutter bars, and actuating means for said cutter bars including brackets fixed to said elongated bars and having bosses arranged side by side above said superposed cutter bars for attachment to pitman rods, one of said brackets being upon the upper face of the uppermost elongated bar, and the other bracket having a portion secured to the underside of the lowermost elongated bar and having a portion movable in a slot in said supporting bar.

2. In a mowing machine, a cutter mechanism comprising two reciprocating cutter bars arranged in superposed relation, each cutter bar having an elongated bar and a series of blades fixed thereto, said elongated bars extending in the same general direction and being substantially parallel, the blades being upon the opposed faces of said elongated bars and projecting laterally therefrom, a common support for said cutter bars, and actuating means for said cutter bars including brackets fixed to said elongated bars and having bosses for attachment to pitman rods, one of said brackets being upon the upper face of the uppermost elongated bar, and the other bracket having a portion secured to the underside of the lowermost elongated bar and having a portion movable in a slot in said support.

3. In a mowing machine, a cutter mechanism comprising two reciprocating cutter bars arranged in superposed relation, a common support for said cutter bars, and actuating means for said cutter bars including brackets fixed to said cutter bars and having bosses for attachment to pitman rods, one of said brackets being upon the upper face of the uppermost cutter bar, and the other bracket having a portion secured to the underside of the lowermost cutter bar and having a portion movable in a slot in said support.

ROBERT W. WAGNER.